April 3, 1962 P. ARRAGON 3,027,764
APPARATUS FOR MEASURING LARGE FLUID FLOWS
Filed Dec. 27, 1957 2 Sheets-Sheet 1
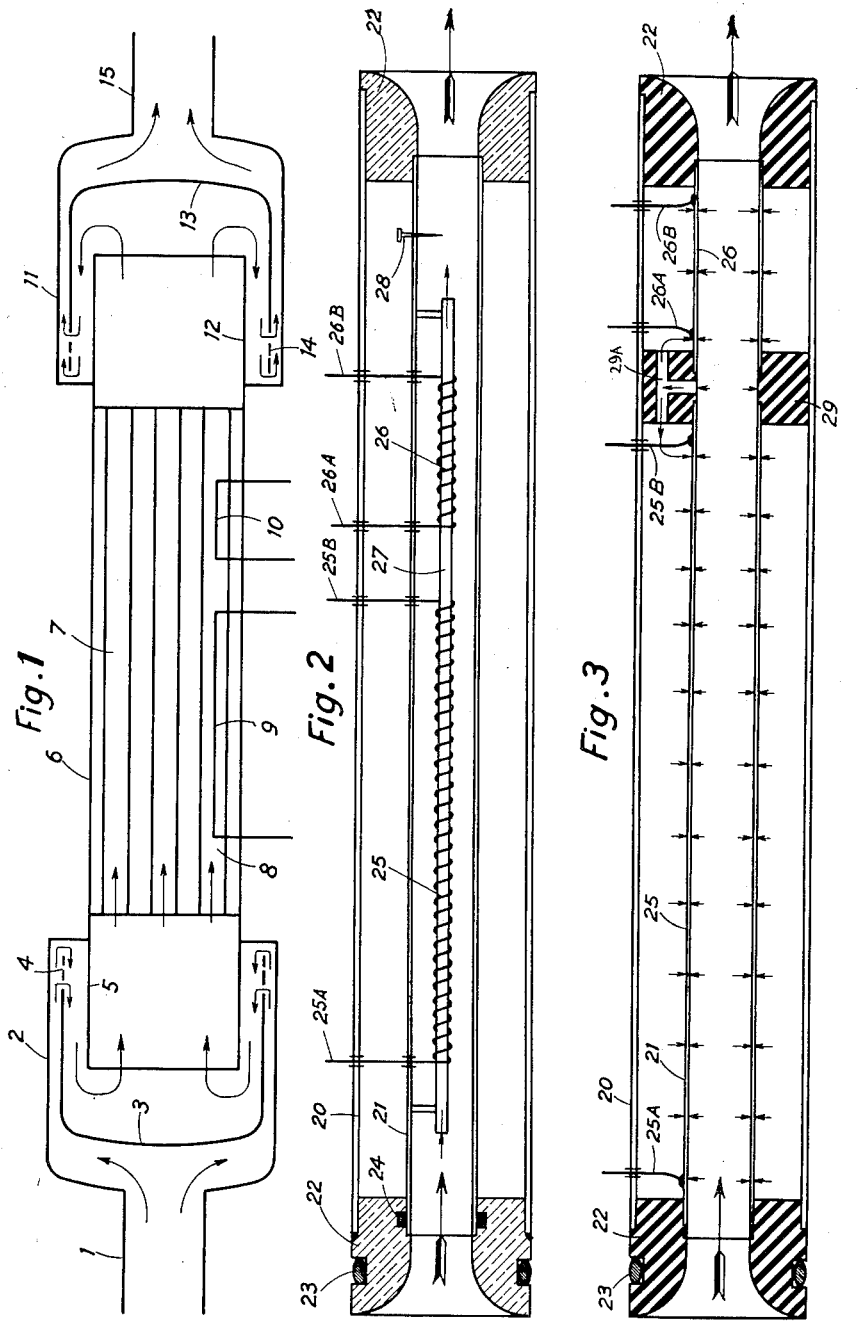
INVENTOR
PHILIPPE ARRAGON
BY Irwin S. Thompson
ATTY.

United States Patent Office 3,027,764
Patented Apr. 3, 1962

3,027,764
APPARATUS FOR MEASURING LARGE
FLUID FLOWS
Philippe Arragon, Asnieres, France, assignor to L'Air
Liquide, Societe Anonyme pour l'Études et l'Exploitation des Procedes Georges Claude, Paris, France
Filed Dec. 27, 1957, Ser. No. 705,564
Claims priority, application France Jan. 2, 1957
7 Claims. (Cl. 73—202)

The measuring of fluid flows, in particular in the case of gases may be executed either through the agency of apparatus measuring the pressure drop of the fluid as it passes over a hindrance opposing its flow or else by means of volume measuring apparatus or again by means of apparatus sensitive to other physical conditions, in particular thermal effects.

In this latter case, the comparative complexity of the phenomena does not allow ascertaining theoretically the relationship between the magnitude to be measured, the flow and the indicating magnitude such as the intensity of an electric current. It is consequently necessary to execute a preliminary gauging of the measuring apparatus. Said gauging which is in principle a comparatively simple matter becomes however difficult and expensive when the apparatus is to be used for measuring large flows of the magnitude of, for instance, 10,000 cubic meters per hour.

It has already been attempted to execute a measuring of the flow only on a well defined fraction of the total flow. It has been proposed in particular in the French Patent No. 465,624, filed on April 21, 1914 to produce a measuring instrument constituted by a section of the fluid pipe, which section is subdivided into a plurality of identical passageways of which one is provided with the actual measuring means while the others are provided with similar means which are however inoperative, so that the pressure drop of the fluid may remain uniform for the fluid passing through these different passageways forming a bundle, which allows retaining equality between the flows in the different pipes. It is however very difficult in practice to obtain a pressure drop of the fluid which is perfectly equal for the passages through such different passageways so that it is necessary to resort to an adjustment of the pressure drop provided in said different passageways, which operation is long and tedious. On the other hand, whereas it is possible to thus subdivide a pipe section into a limited number of channels, for instance 2, 3 or 4, channels, so as to allow the execution of the measuring and consequently also of the preliminary gauging over a substantial fraction, say one half, one third or one quarter, of the total flow, the use of such an arrangement cannot be contemplated when it is desired to execute the measurement only over a much smaller fraction of the total throughput, of a magnitude of say 1/100, as required for the large flows referred to hereinabove, since it is then practically impossible to insert in each elementary channel an arrangement similar to the actual measuring means.

The improved apparatus of the invention allows in contradistinction executing the measurement of high flows by causing only a small fraction of the total flow to pass over the measuring instrument while a single measuring instrument is provided for the whole apparatus. Said apparatus includes in a manner similar to already known apparatus a bundle of tubes or pipes inserted in parallel in a fluid conveying line, one of said pipes only being provided with a measuring instrument. According to the present invention, the other pipes are bare and similar to each other while the size of the single measuring pipe is selected so as to produce a pressure drop of the fluid through it which is less than through the other pipes by an amount equal to the complementary pressure drop produced by the insertion of the measuring instrument. It is possible for instance to provide the measuring pipe with an inner cross-sectional area which is slightly larger than that of the other pipes.

When the measuring instrument is positioned directly in the fluid current, it is comparatively difficult in practice to obtain an accurate compensation. It is consequently preferable in this case and in accordance with a preferred embodiment of the invention to give the measuring pipe a size such that the pressure drop through said pipe is slightly lower than the desired value, taking into account the presence of the measuring instrument therein, the pipe being thereafter accurately adjusted by means of an ancillary device producing a small adjustable additional pressure drop; said ancillary device may be constituted for instance by a small needle which is caused to engage the pipe to a variable extent.

It is also possible to give the measuring pipe a size equal to that of the other pipes of the bundle, by fitting the measuring instrument inside the wall of the measuring pipe so as to oppose no hindrance to the flow of fluid. The necessity of incorporating an ancillary device for the pressure drop may then be avoided more easily.

The accuracy of the result obtained through an equal distribution of the fluid throughput in the different pipes of the bundle executed as described hereinabove would however be illusory if the fluid did not show at the input end of the bundle of pipes homogeneous temperature and pressure conditions or were to lose too rapidly this homogeneity at the output end. Now this homogeneity is precisely reached only in an insufficient manner in the channels provided for large flows and having a large diameter, wherein the peripheral fluid layers are more subjected to heat exchange with the ambient atmosphere than the central layers while furthermore the flow is slower near the wall than near the axis.

There is obtained, according to the invention, the necessary temperature and pressure equalization by causing the totality of the fluid to pass, ahead of and beyond the bundle of pipes serving for the measuring of the flow, through homogenizing arrangements such as so-called quietening chambers inside which the fluid follows a sinuous path along which the different layers exchange their heat and are admixed before reaching the input end of the bundle of pipes.

The measuring means which are more generally used are based on the modification in the amount of heat removed by the fluid from a hot body inserted in the fluid stream, as a function of the flow. This hot body is generally an electric wire heated by the Joule effect and there is measured the resistance of the wire which is a function of its temperature, through dissipation in said wire of a constant power, or else there is measured the power to be supplied to it for maintaining a resistance and consequently a temperature of constant value. In order, to cut out any errors which may be produced by any change of the fluid temperature, there is positioned ahead of the heated resistance a second resistance which is allowed to take up the temperature of the fluid and the two resistances are inserted in the arms of a Wheatstone bridge in accordance with a known diagram. The indication given by a measuring galvanometer is then independent of the temperature of the fluid.

It is also possible to use measuring devices which are sensitive to other physical properties of the fluid, for instance magnetic properties.

There is described hereinafter by way of example, references being made to the accompanying drawings an apparatus for executing the invention with a view to measuring gas flows, together with various modifications of its chief parts.

FIGURE 1 illustrates diagrammatically the system formed by an apparatus provided with a bundle of pipes.

FIGURE 2 illustrates a measuring pipe in which the resistances are constituted by wires wound over an insulating support arranged axially of the pipe.

FIGURE 3 illustrates a measuring pipe in which the resistances are constituted by sections of the wall of the pipe.

Figure 4:
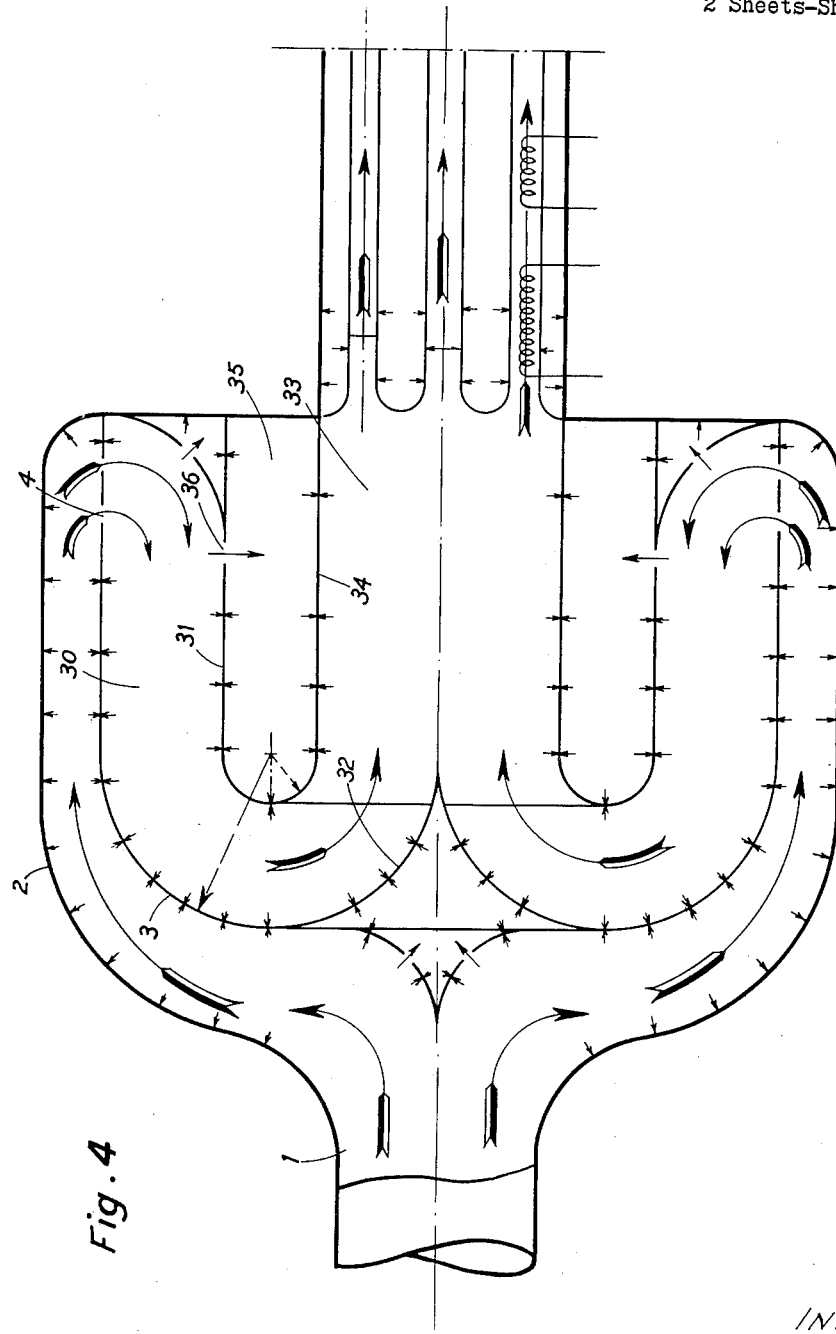
FIGURE 4 illustrates a chamber for homogenizing the temperature and the pressure of the gas at the input of the bundle of pipes, said chamber being particularly convenient in the case where the gas flows at a high speed (above 1 meter per second).

Referring now to FIGURE 1, the gas of which it is desired to measure the flow arrives through the channel 1 and enters first a so-called quietening chamber 2 which allows homogenizing its temperature and its pressure. Inside said chamber is located a partition 3 which allows deflecting the stream of gases towards the periphery of the chamber. The gas stream thus deflected enters then through the ports 4 provided in the partition 3 near the end thereof into an annular area bounded by a second partition 5 inside which the stream returns rearwardly. It reaches then the central area bounded by the partition 5 and moves towards the input of the bundle of tubes 6. The length of the central area bounded by the partition 5 is preferably substantially equal to the diameter of the bundle 6. The quietening chamber described hereinabove is suitable when the speed of the gas is moderate (lower than or equal to 1 meter per second). There will be described hereinafter, as mentioned above, another type of quietening chamber suitable for higher gas speeds.

The tubular bundle 6 includes a number of identical pipes 7 and a measuring pipe 8. Although for sake of clarity only a small number of pipes has been illustrated in the figure, said number may in practice be comparatively high.

With a view to obtaining a perfectly equal distribution of the total flow between all the pipes, the diameters and the lengths of the latter are adjusted with a high accuracy and their inner surfaces are made as uniform as possible, for instance through electrolytic chromium-plating and polishing.

The measuring pipe carries two resistances 9 and 10 constituted in the simplest case illustrated in the figure by two resistant wires stretched axially of the pipe; the wire 9 is intended to assume the temperature of the gas to make up for the error which might arise through a modification of the latter and the wire 10 constitutes the actual heated resistance. These two wires form two of the arms of a Wheatstone bridge which is not illustrated and is provided with measuring apparatus in the conventional manner.

At its output from the bundle of pipes, the gas enters a second homogenizing chamber 11 identical with the chamber 2 and including two partitions 12 and 13, the second partition being provided at its end with openings 14. The gas enters then the downstream channel 15.

In FIGURE 2, the gas enters through the left hand end of the measuring pipe 20. The latter includes the passage formed by the channel 21 carried by metal nozzles 22 fitted fluid tightly in the tubular input plate of the bundle as provided by an annular packing 23. The fluid-tightness of the connection between the channel 21 and the input nozzle 22 is also ensured through a packing 24. The measuring means include two wires 25 and 26 of a non oxidisable metal having a comparatively high electric resistivity and wound over a tube 27 of a reduced diameter and of a reduced thickness made of superficially oxidised aluminum (alumina forming an excellent electric insulator), arranged along the axis of the measuring pipe. The input and output connections 25A and 25B, 26A and 26B are of course electrically insulated with reference to the measuring pipe.

In order that a flow equal to that of the other pipes of the bundle be passed through the channel 21 in spite of the additional resistance opposing the flow, as provided by the wires and their carrier, the channel 21 has a diameter slightly above that of the other pipes and there is provided near the output end of the pipe a small adjustable needle 28 which may be pushed more or less into the pipe.

In FIGURE 3, the channel 21 has a diameter which is exactly equal to that of the other pipes of the bundle and the resistance adapted to assume the temperature of the gas at 25 and the heating resistance 26 are constituted by sections of the channel wall. The resistance 25 is connected with the electric measuring circuit through the connections 25A and 25B and the resistance 26 is connected through the connections 26A and 26B, which are electrically insulated as they pass through the outer wall of the pipe. On the other hand and with a view to ensuring also electrical insulation, the nozzles 22 are not made of metal but of insulating material and there is inserted between the resistances 25 and 26 an insulating carrier 29 provided with bores 29A which allow the gas to reach the other side of the wall 21 and to balance thus the inner pressure that would risk otherwise deforming the wall, which should be comparatively thin so as to show a sufficient electrical resistance.

The quietening chamber at the input of the tubular bundle illustrated in FIGURE 4 shows a structure which is somewhat different from that described precedingly. It allows obtaining homogeneity in temperature and pressure even if the speed of the gas is high (above 1 meter per second). The gas fed through the channel 1 into the chamber 2 is deflected towards the periphery by the partition 3; it enters then through the openings 4 inside an annular area 30 bounded by a second partition 31; it reaches as guided by the partition 32 the inner area 33 bounded by the partition 34 surrounded by a jacket 35 inside which the gas may enter as it comes from the annular area 30 through the ports 36; it enters lastly the tubular bundle 6.

Although the invention has been described hereinabove in its application to the measurement of gas flows through the agency of arrangements resorting to their thermal conductivity, it should be well understood that said invention is not limited to this particuar case and that it is also applicable to the measurement of liquid flows and can be used in association with all arrangements sensitive to other physical properties of the fluid, provided they do not resort to a pressure drop as a magnitude indicating the flow, or again in association with quietening chambers of types different from those described hereinabove.

What I claim is:

1. An apparatus for measuring large fluid flows of the type including a bundle of pipes inserted in a fluid conveying channel, one of said pipes being a measuring pipe provided with a measuring means, wherein the other pipes are identical and internally unencumbered and the measuring pipe is of such a size that with said measuring device it produces a pressure drop equal to the pressure drop produced by one of said other pipes and that the flow of the fluid is equally divided between all the pipes of the bundle.

2. An apparatus as set forth in claim 1, wherein a small adjustable needle in the measuring pipe allows to produce a small adjustable pressure drop, in said pipe.

3. An apparatus according to claim 1, wherein the measuring means comprises at least an electrical resistor wound around an insulating core lying on the axis of the measuring tube.

4. An apparatus as set forth in claim 1, wherein the measuring means are fitted in the wall of the measuring pipe.

5. An apparatus according to claim 4, wherein the measuring means comprises at least an electrically conductive part of the wall of the measuring tube, surrounded by electrically insulating parts of said wall.

6. An apparatus according to claim 5, wherein the wall is perforated with holes ensuring an equalization of the pressure upon its two faces.

7. An apparatus as set forth in claim 1 wherein temperature and pressure homogenizing chambers are provided on the upstream and on the downstream sides of the tubular bundle, to homogenize the whole of the flow passing through the bundle of tubes.

References Cited in the file of this patent

UNITED STATES PATENTS

| | | |
|---|---|---|
| 1,105,581 | Rusby | July 28, 1914 |
| 2,163,730 | Goetyl | June 27, 1939 |
| 2,255,771 | Golay | Sept. 16, 1941 |
| 2,446,283 | Hulsberg | Aug. 3, 1948 |
| 2,552,017 | Schwartz et al. | May 8, 1951 |